US008422038B2

(12) United States Patent
Mori

(10) Patent No.: US 8,422,038 B2
(45) Date of Patent: Apr. 16, 2013

(54) INFORMATION PROCESSING APPARATUS AND STORAGE MEDIUM READABLE BY COMPUTER THEREFOR FOR HANDLING MULTIPLE PAGE IMAGES

(75) Inventor: Hiromi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1606 days.

(21) Appl. No.: 11/389,072

(22) Filed: Mar. 27, 2006

(65) Prior Publication Data
US 2006/0250630 A1 Nov. 9, 2006

(30) Foreign Application Priority Data

Mar. 28, 2005 (JP) .................................. 2005-092121

(51) Int. Cl.
*G06F 15/00* (2006.01)
(52) U.S. Cl.
USPC ........................................................ 358/1.13
(58) Field of Classification Search .................. 358/1.15
See application file for complete search history.

(56) References Cited

U.S. PATENT DOCUMENTS

| | | | | |
|---|---|---|---|---|
| 4,763,167 A * | 8/1988 | Watanabe et al. | ............. | 347/155 |
| 5,923,013 A * | 7/1999 | Suzuki et al. | ................ | 235/375 |
| 6,094,552 A * | 7/2000 | Haneda et al. | ................ | 399/193 |
| 6,411,400 B1 * | 6/2002 | Mori | .............................. | 358/1.2 |
| 6,618,566 B2 * | 9/2003 | Kujirai et al. | .................... | 399/79 |
| 6,661,530 B1 * | 12/2003 | Munetomo et al. | ........... | 358/1.15 |
| 6,694,487 B1 * | 2/2004 | Ilsar | ............................... | 715/247 |
| 6,827,514 B1 * | 12/2004 | Shima | ........................... | 400/582 |
| 6,842,262 B1 * | 1/2005 | Gillihan et al. | ............... | 358/1.15 |
| 6,847,466 B1 * | 1/2005 | Gazdik et al. | ................. | 358/1.15 |
| 6,883,981 B2 * | 4/2005 | Kizaki et al. | ..................... | 400/76 |
| 6,896,426 B2 * | 5/2005 | Nakagiri | .......................... | 400/76 |
| 6,927,865 B1 * | 8/2005 | Kujirai et al. | ................. | 358/1.12 |
| 6,934,046 B1 * | 8/2005 | Nishikawa et al. | ........... | 358/1.15 |
| 6,965,440 B1 * | 11/2005 | Nakagiri et al. | .............. | 358/1.12 |
| 7,002,707 B2 * | 2/2006 | Kujirai | ............................ | 358/1.9 |
| 7,092,111 B2 * | 8/2006 | Nishikawa et al. | ............. | 358/1.1 |

(Continued)

FOREIGN PATENT DOCUMENTS

| | | |
|---|---|---|
| JP | H11-252326 A | 9/1999 |
| JP | 200025311 | 1/2000 |

(Continued)

OTHER PUBLICATIONS

Adobe Photoshop 7.0 Classroom in a Book, Peachpit Press, California, 2002, pp. 365-366.*

(Continued)

*Primary Examiner* — Saeid Ebrahimi Dehkordy
(74) *Attorney, Agent, or Firm* — Baker Botts L.L.P.

(57) ABSTRACT

An information processing apparatus includes: a display unit which displays images; an input unit through which an instruction is input from outside; a page image display processing unit which causes the display unit to display at least two page images each representing a print page; a page image moving unit which moves the at least two page images displayed on the display unit by the page image display processing unit, on the basis of the instruction input through the input unit from the outside; and a condition setting unit which sets a printing condition, on the basis of a positional relationship between at least two page images that are moved by the page image moving unit.

16 Claims, 10 Drawing Sheets

U.S. PATENT DOCUMENTS

| | | | |
|---|---|---|---|
| 7,103,837 B2 * | 9/2006 | Sato | 715/274 |
| 7,131,775 B2 * | 11/2006 | Uchida et al. | 400/62 |
| 7,145,687 B2 * | 12/2006 | Nishikawa et al. | 358/1.18 |
| 7,149,451 B2 * | 12/2006 | Uchida et al. | 399/81 |
| 7,154,627 B2 * | 12/2006 | Nishikawa et al. | 358/1.15 |
| 7,161,691 B2 * | 1/2007 | Nakagiri et al. | 358/1.13 |
| 7,161,711 B2 * | 1/2007 | Mori et al. | 358/1.9 |
| 7,194,696 B2 * | 3/2007 | Mori | 715/783 |
| 7,203,900 B2 * | 4/2007 | Nara et al. | 715/255 |
| 7,239,405 B2 * | 7/2007 | Yamade et al. | 358/1.15 |
| 7,259,874 B2 * | 8/2007 | Nishikawa et al. | 358/1.1 |
| 7,268,909 B2 * | 9/2007 | Nakagiri | 358/1.16 |
| 7,274,890 B2 * | 9/2007 | Uchida et al. | 399/81 |
| 7,281,209 B2 * | 10/2007 | Nara et al. | 715/255 |
| 7,286,250 B2 * | 10/2007 | Kujirai et al. | 358/1.15 |
| 7,299,413 B2 * | 11/2007 | Mori | 715/255 |
| 7,301,656 B1 * | 11/2007 | Nakagiri et al. | 358/1.15 |
| 7,307,749 B2 * | 12/2007 | Nishikawa et al. | 358/1.15 |
| 7,359,084 B2 * | 4/2008 | Nara et al. | 358/1.18 |
| 7,362,465 B2 * | 4/2008 | Nishikawa et al. | 358/1.16 |
| 7,379,950 B2 * | 5/2008 | Sato et al. | 707/104.1 |
| 7,385,712 B2 * | 6/2008 | Nakagiri et al. | 358/1.12 |
| 7,394,562 B2 * | 7/2008 | Nakagiri et al. | 358/1.18 |
| 7,428,072 B2 * | 9/2008 | Suzuki | 358/1.18 |
| 7,474,439 B2 * | 1/2009 | Uchida et al. | 358/1.9 |
| 7,500,203 B2 * | 3/2009 | Mori | 715/859 |
| 7,559,024 B2 * | 7/2009 | Mori et al. | 715/273 |
| 2001/0044868 A1 * | 11/2001 | Roztocil et al. | 710/129 |
| 2002/0171871 A1 * | 11/2002 | Catt et al. | 358/1.18 |
| 2003/0051625 A1 * | 3/2003 | Miyazato | 101/484 |
| 2003/0056180 A1 * | 3/2003 | Mori | 715/530 |
| 2003/0066027 A1 * | 4/2003 | Nakagiri | 715/500 |
| 2003/0070146 A1 * | 4/2003 | Sato et al. | 715/525 |
| 2003/0159114 A1 * | 8/2003 | Nishikawa et al. | 715/530 |
| 2003/0184787 A1 * | 10/2003 | Kuroda et al. | 358/1.13 |
| 2004/0114184 A1 * | 6/2004 | Sugiyama | 358/1.18 |
| 2004/0174551 A1 * | 9/2004 | Kurohata et al. | 358/1.12 |
| 2004/0190057 A1 * | 9/2004 | Takahashi et al. | 358/1.15 |
| 2005/0038919 A1 | 2/2005 | Matsubara et al. | |
| 2005/0073714 A1 * | 4/2005 | Makishima | 358/1.15 |
| 2005/0088701 A1 * | 4/2005 | Uchida et al. | 358/3.28 |
| 2005/0094208 A1 * | 5/2005 | Mori | 358/1.18 |
| 2005/0105116 A1 * | 5/2005 | Kobashi | 358/1.12 |
| 2005/0105129 A1 * | 5/2005 | Takahashi | 358/1.15 |
| 2005/0128500 A1 * | 6/2005 | Nakagiri | 358/1.9 |
| 2005/0128516 A1 * | 6/2005 | Tomita | 358/1.15 |
| 2005/0146732 A1 * | 7/2005 | Kizaki et al. | 358/1.6 |
| 2005/0162689 A1 * | 7/2005 | Roztocil | 358/1.15 |
| 2005/0174596 A1 * | 8/2005 | Uchida et al. | 358/1.14 |
| 2005/0206953 A1 * | 9/2005 | Kujirai et al. | 358/1.15 |
| 2005/0206956 A1 * | 9/2005 | Hagiwara | 358/1.18 |
| 2006/0119892 A1 * | 6/2006 | Kujirai | 358/1.15 |
| 2007/0127073 A1 * | 6/2007 | Goel et al. | 358/1.18 |
| 2007/0258097 A1 * | 11/2007 | Nishikawa et al. | 358/1.1 |
| 2007/0268522 A1 * | 11/2007 | Miyamoto | 358/1.18 |
| 2007/0294532 A1 * | 12/2007 | Kujirai et al. | 713/170 |
| 2008/0043285 A1 * | 2/2008 | Nakagiri et al. | 358/1.15 |
| 2008/0137140 A1 * | 6/2008 | Kurohata et al. | 358/1.15 |
| 2008/0151305 A1 * | 6/2008 | Nara et al. | 358/1.18 |
| 2008/0239398 A1 * | 10/2008 | Nakagiri et al. | 358/1.18 |
| 2008/0259166 A1 * | 10/2008 | Silverbrook et al. | 348/207.2 |
| 2008/0292352 A1 * | 11/2008 | Kurohata et al. | 399/81 |
| 2009/0080958 A1 * | 3/2009 | Uchida et al. | 400/62 |

FOREIGN PATENT DOCUMENTS

| | | | |
|---|---|---|---|
| JP | 2001-125757 A | | 5/2001 |
| JP | 2004-282439 A | | 10/2004 |
| JP | 2004282439 | * | 10/2004 |
| JP | 2004282439 A | * | 10/2004 |
| JP | 2005-064859 A | | 3/2005 |
| JP | 2006-247873 A | | 9/2006 |

OTHER PUBLICATIONS

Adobe Photoshop 7 Classroom in a Book, Peachpit Press, California, 2002, pp. 365-366.*

Brother User's Guide—MFC-8420 MFC-8820D MFC-8820DN, 2003, p. 12-7.*

Ricoh Aficio 551700 Operating Instructions Copy Reference, 2000, p. 133.*

Japan Patent Office, Office Action in corresponding Japanese Patent Application No. 2005-092121 dated Jul. 29, 2008.

* cited by examiner

FIG. 7A

| MEMORY | SET VALUE | SETTING |
|---|---|---|
| NupOrg | 0 | NORMAL PRINTING |
| | 1 | 2in1 |
| | 2 | 4in1 |
| | ⋮ | ⋮ |

FIG. 7B

| MEMORY | SET VALUE | SETTING |
|---|---|---|
| NupDir | 0 | FORWARD ORDER |
| | 1 | REVERSE ORDER |

FIG. 7C

| MEMORY | SET VALUE | SETTING |
|---|---|---|
| DupOrg | 0 | NORMAL PRINTING |
| | 1 | LONG-SIDE DUPLEX PRINTING |
| | 2 | SHORT-SIDE DUPLEX PRINTING |

INFORMATION PROCESSING APPARATUS AND STORAGE MEDIUM READABLE BY COMPUTER THEREFOR FOR HANDLING MULTIPLE PAGE IMAGES

CROSS-REFERENCE TO RELATED APPLICATIONS

This application is based on and claims the benefit of priority from the prior Japanese Patent Application No. 2005-92121, filed on Mar. 28, 2005; the entire contents of which are incorporated herein by reference

TECHNICAL FIELD

The present invention relates to an information processing apparatus for a setting printing condition and a storage medium readable by a computer therefor.

BACKGROUND

In a related art, setting the printing conditions of a printer using, for example, a personal computer has been performed by using a printer driver corresponding to the printer. In general, the printer driver displays set items, such as the size of a sheet and resolution, in a dialogue box and also displays candidates of set values that can be selected with respect to the set items (for example, when the set item is a sheet size, A5, B5, A4, B4, A3, and B3) by using, for example, a pull-down menu, such that a user can select the set values. However, in recent years, with the development of a multi-function printer, set items or set values that can be selected with respect to the set items increase, which results in a complicated structure of the dialogue box and a troublesome operation in setting the printing conditions.

Therefore, the following technique has been proposed: a program other than the printer driver can set some of the set items (see JP-A-2000-025311). More specifically, in a printer including a plurality of sheet discharge trays, set items of the sheet discharge trays can be easily set by a simple operation, and a setting screen composed of fields displaying the figures of the plurality of sheet discharge trays and fields displaying names of the sheet discharge trays is displayed. In addition, the setting of the sheet discharge tray, which is set as a sheet discharge destination, is changed by displaying the sheet discharge tray in the field in a different color or by reversely displaying the sheet discharge tray, and by performing an operation of selecting a different sheet discharge tray on the setting screen.

SUMMARY

In the above-structure disclosed in the related art, the candidates of the set values that can be selected with respect to the set items are displayed, such that the user can select the set values. In this way, the user sets the printing conditions.

However, the printing condition setting operation is merely a simple operation of selecting a predetermined position on a screen regardless of content to be set (for example, an operation of clicking the left button of a mouse), but is not an intuitive operation. In the structure disclosed in JP-A-2000-025311, the figures of the plurality of discharge trays are displayed on the screen such that the content of selectable set values can be easily visually recognized. However, this operation is also merely a simple operation of selecting a predetermined position on the screen.

The present invention has been made in view of the above circumstances and provides information processing apparatus and storage medium readable by computer to intuitively set printing condition.

According to an aspect of the invention, An information processing apparatus includes: a display unit which displays images; an input unit through which an instruction is input from outside; a page image display processing unit which causes the display unit to display at least two page images each representing a print page; a page image moving unit which moves the at least two page images displayed on the display unit by the page image display processing unit, on the basis of the instruction input through the input unit from the outside; and a condition setting unit which sets a printing condition, on the basis of a positional relationship between at least two page images that are moved by the page image moving unit.

BRIEF DESCRIPTION OF THE DRAWINGS

These and other objects and advantages of this invention will become more fully apparent from the following detailed description taken with the accompanying drawings in which:

FIGS. 7A to 7C are diagrams illustrating the setting of printing conditions;

DESCRIPTION OF THE ILLUSTRATIVE ASPECTS

Hereinafter, illustrative aspects will be described with reference to the accompanying drawings.

[1. Overall Structure]

Figure 1:
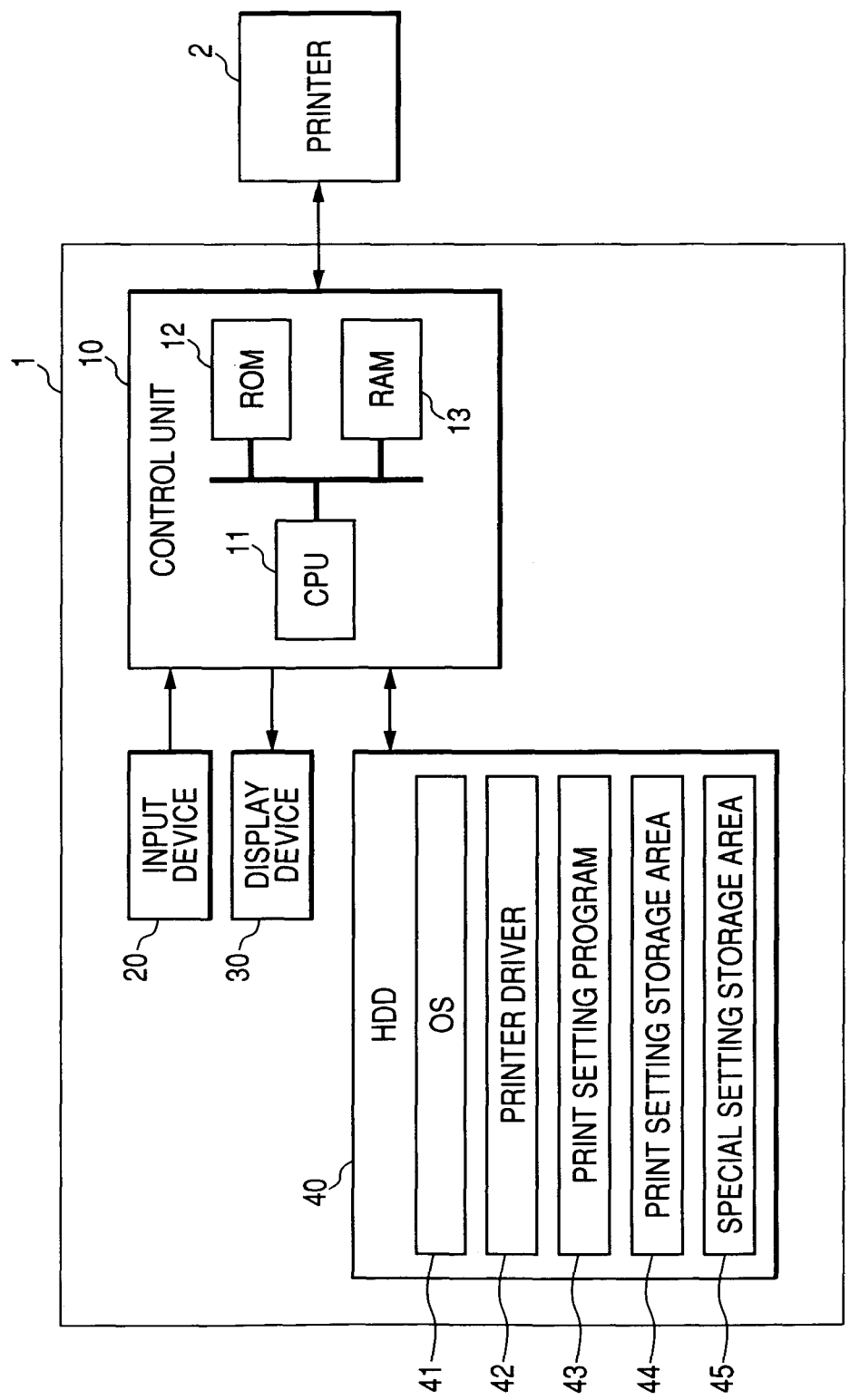
FIG. 1 is a block diagram illustrating the schematic structure of a personal computer according to an illustrative aspect.

FIG. 1 is a block diagram schematically illustrating a structure of a personal computer 1 (hereinafter, referred to as a 'PC'), serving as an information processing apparatus according to an illustrative aspect.

As shown in FIG. 1, a PC 1 includes a control unit 10, an input device 20, a display device 30, and a hard disk 40.

The control unit 10 includes, for example, a CPU 11, a ROM 12, and a RAM 13 and collectively controls the PC 1.

The input device 20 is used for a user to input instructions to the control unit 10 from an outside. In the illustrative aspect, a keyboard and a pointing device (for example, a mouse) are used as the input device 20.

The display device 30 is connected to an image processing circuit (not shown) provided in the control unit 10 and displays an image corresponding to data output from the control unit 10 on a display screen. In the illustrative aspect, a liquid crystal display device is used as the display device 30.

The hard disk 40 serves as an auxiliary storage device of the control unit 10 and has, for example, an operating system (hereinafter, referred to as an 'OS') 41, a printer driver 42, and a print setting program 43 installed therein. A print setting storage area 44 and a special setting storage area 45 are provided in the hard disk 40 as data storage areas.

For example, a Windows (registered trademark) series having a graphical user interface (GUI) provided therein is used as the OS 41.

The printer driver 42 is software for controlling a printer (in the illustrative aspect, a printer capable of printing images on both sides of a recording medium, such as a sheet) 2 that is connected to the PC 1 such that it can communicate with the PC 1, and is operated under the control of the OS 41.

The print setting program 43 is software for setting some of set items that can be set by the printer driver 42 by an intuitive operation, and is operated under the control of the OS 41, similar to the printer driver 42. More specifically, the print setting program 43 allows a printing condition setting window 50 (see FIG. 3) on which two page images 51 (which serves as "at least two images"), which are images of print pages, are displayed on the display screen of the display device 30, by using the GUI mounted in the OS 41. In addition, the print setting program 43 moves the page images 51 arranged on the printing condition setting window 50, in response to instructions input by the input device 20 from the outside, and sets printing conditions on the basis of the positional relationship between the page images 51.

[2. Relationship Between Printer Driver and Print Setting Program]

Next, the relationship between the printer driver 42 and the print setting program 43 will be described below.

Figure 2:
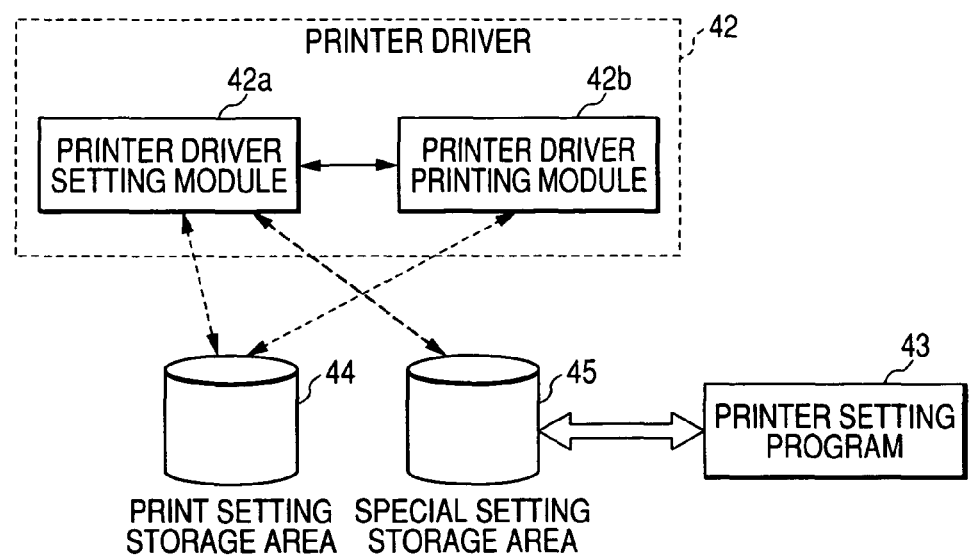
FIG. 2 is a diagram illustrating the structure of a module of a print setting program and a printer driver.

As shown in FIG. 2, the printer driver 42 includes a printer driver setting module 42a and a printer driver printing module 42b. The printer driver setting module 42a mainly manages set values related to the printing conditions of the printer 2, and the printer driver printing module 42b mainly creates print data or control data.

Meanwhile, the print setting program 43 is a program that is operated as a different process from the printer driver 42, and manages some of the set items related to the printing conditions of the printer 2. More specifically, various set items related to the printing conditions of the printer 2 are separately stored in the print setting storage area 44 and the special setting storage area 45 of the hard disk 40. Set values that can be read by the printer driver 42 are stored in the print setting storage area 44, and data that can be read by both the printer driver 42 and the print setting program 43 are stored in the special setting storage area 45. In the illustrative aspect, set values for Nin1 printing (hereinafter, referred to as "Nup printing") and Duplex printing (double side printing) are stored in the special setting storage area 45.

Further, when there is no set value for starting the print setting program 43 in the print setting storage area 44, the print setting program 43 starts by the printer driver 42 and is executed until a predetermined operation is completed. In this case, it is possible to set the start of the print setting program 43 by checking a predetermined check box in a dialogue box of the printer driver 42. That is, when the check box is checked, a setting value for starting the print setting program 43 is stored in the print setting storage area 44. Then, the print setting storage area 44 is referred at the time when the printer driver 42 starts. As a result of reference, when there is a set value for starting the print setting program 43, the print setting program 43 starts.

[3. Function of Print Setting Program]

Next, the function of the print setting program 43 will be described below.

Figure 3:
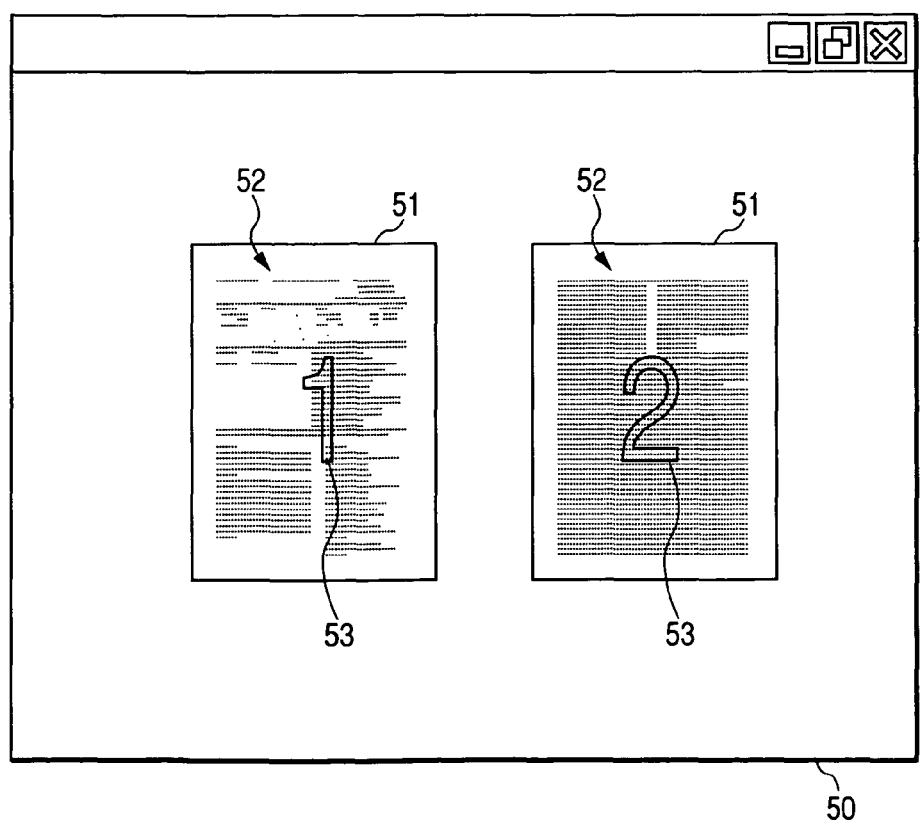
FIG. 3 is a diagram illustrating a printing condition setting window.

FIG. 3 is a diagram illustrating the printing condition setting window 50 displayed on the display screen of the display device 30 when the print setting program 43 is executed. The printing condition setting window 50 can be moved to an arbitrary position on the display screen of the display device 30, and the size of the printing condition setting window 50 can be adjusted. The printing condition setting window 50 may be of a transmissive type.

Two page images 51 are arranged on the printing condition setting window 50 at a gap. The page images 51 indicate a first print page and a second print page. In the illustrative aspect, images of recording media having images 52 to be actually printed are displayed, and print page numbers 53 ('1' and '2') are displayed at the centers of the images. In addition, FIG. 3 shows a case in which orientation is set to a portrait (a recording medium elongating in a vertical direction). When the orientation is set to a landscape (a recording medium elongating in a horizontal direction), images of recording media elongating in the horizontal direction are used as the page images 51.

The display of the printing condition setting window 50 makes it possible for a user to intuitively set the Nup printing and the Duplex printing. Next, a method of setting the Nup printing and the Duplex printing will be described below.

The setting of the Nup printing is performed by an operation of arranging two page images 51 in parallel to each other or an operation of dividing one image page 51 into two pieces.

That is, when setting is changed from the Nup printing (first printing condition) to 2Nin1 printing (second printing condition) (2N is a value that is two times larger than N), one of two page images 51 is moved so as to be arranged in parallel to the other page image 51 by the external operation of the input device 20 (in the illustrative aspect, a drag-and-drop operation by a pointing device).

Figure 4A:
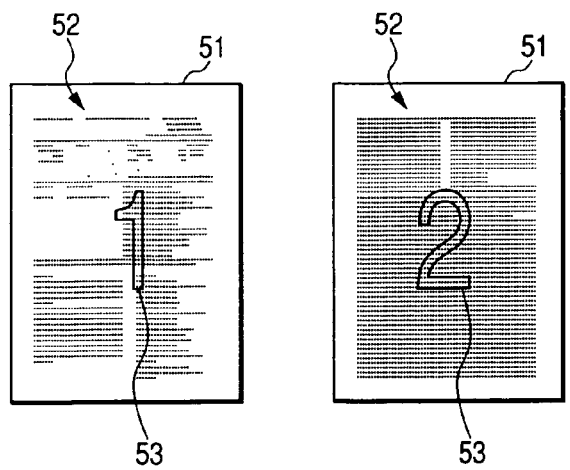
FIGS. 4A to 4C are diagrams illustrating the setting of Nup printing.

This will be described in more detail with reference to FIGS. 4A to 4C. First, as shown in FIG. 4A, in a state in which the page image 51 of a first page and the page image 51 of a second page are arranged at a predetermined gap on the display screen of the display device 30, a pointer of the pointing device for designating an arbitrary position is positioned on the page image 51 of the second page, and then a selecting operation (an operation of pushing a button) is performed.

Subsequently, a drag operation of moving the pointer, with the selecting operation being continuously performed (with the button being pushed), such that the page image 51 of the second page are arranged in parallel to the page image 51 of the first page is performed. The page image 51, which is a target of drag, may be discriminated by, for example, reverse display.

Figure 4B:
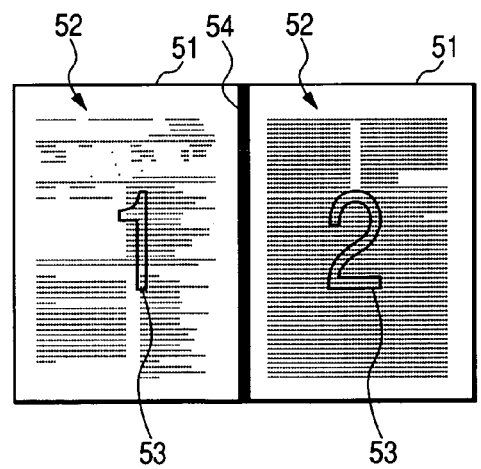
Figure 4C:
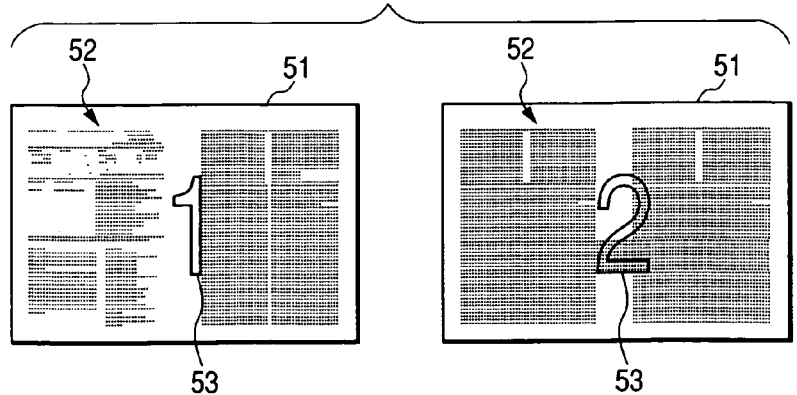

As shown in FIG. 4B, when two page images 51 are positioned parallel to each other by the drag operation of the page images 51, Nup available display indicating that the Nup printing can be set is performed by a drop operation. In the illustrative aspect, bold lines 54 having a color different from that of the page images 51 are displayed on two sides of the page images 51 opposite to each other.

When the drop operation is performed on the page image 51 of the second page in a state in which the Nup available display is executed, the setting of the Nin1 printing is changed to the setting of the 2Nin1 printing. Then, as shown in FIG. 4C, the two page images 51 of the first and second pages that have been separately displayed at that time are displayed in parallel to each other on one page image 51 of the first page.

In addition, two page images of third and fourth pages to be printed are displayed in parallel to each other on the page image 51 of the second page.

Further, when the setting of the 2Nin1 printing is changed to the setting of the Nin1 printing, a portion of the page image 51 of the first page (more specifically, assuming that the setting of the 2Nin1 printing is changed to the setting of the Nin1 printing, one of two divided portions) is moved to a position separated from the remaining portion of the page image by an external operation of the input device 20 (in the illustrative aspect, a drag-and-drop operating using a pointing device). That is, it is possible to return to original setting by performing the operation of changing the setting of the Nin1 printing to the setting of the 2Nin1 printing and an inverse operation thereof.

Meanwhile, the setting of the Duplex printing is performed by an operation of arranging two page images 51 so as to overlap each other or an operation of dividing one page image 51 obtained by overlapping two pages.

That is, when setting is changed from single-side printing to double-side printing, one of two page images 51 is moved so as to overlap the other page image 51 by an external operation of the input device 20 (in the illustrative aspect, a drag-and-drop operating using a pointing device).

Figure 5A:
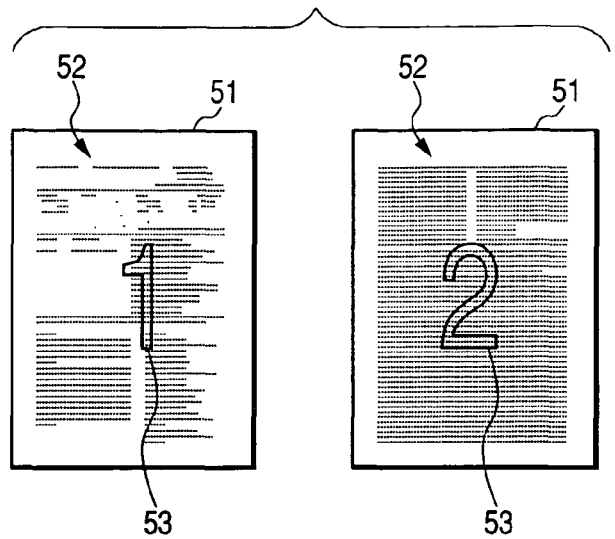
FIGS. 5A to 5C are diagrams illustrating the setting of Duplex printing.

An example shown in FIGS. 5A to 5C will be described below. As shown in FIG. 5A, in a state in which the page image 51 of a first page and the page image 51 of a second page are arranged at a predetermined gap, a pointer of the pointing device is positioned on the page image 51 of the second page, and then a selecting operation (an operation of pushing a button) is performed.

Subsequently, a drag operation of moving the pointer, with the selecting operation being continuously performed (with the button being pushed), such that the page image 51 of the second page overlaps the page image 51 of the first page is performed.

Figure 5B:
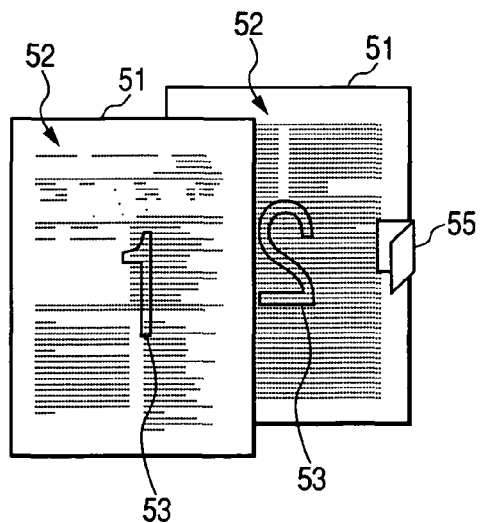
Figure 5C:
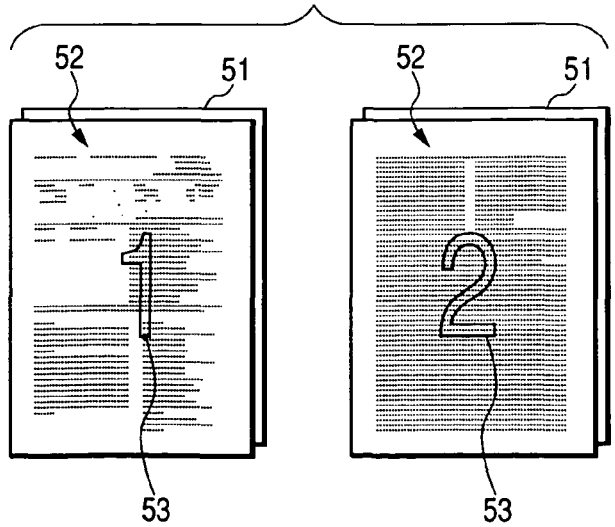

As shown in FIG. 5B, when two page images 51 overlap each other by the drag operation of the page images 51, Duplex available display indicating that the Duplex printing can be set is performed by a drop operation. In the illustrative aspect, an icon 55 is displayed, and the page image 51, which is a drag target, and a print page number 53 are reversely displayed.

When a drop operation is performed on the page image 51 of the second page in a state in which the Duplex available display is performed, the setting of the single-side printing (third printing condition) is changed to the setting of the double-side printing (fourth printing condition). As shown in FIG. 5C, each page image 51 is changed to an image in which two recording media overlap each other with their rear surfaces being opposite to each other. In addition, an image to be printed on a third page is displayed on the page image 51 of the second page. For example, the page image 51 may be displayed in a pale color or pure while in order to display the reversed page image 51.

Furthermore, when setting is changed from the double-side printing to the single-side printing, a portion of the page image 51 of the first page (more specifically, one of two recording media which overlaps each other and are displayed as the page image 51) is moved to a position separated from the remaining portion of the page image by an external operation of the input device 20 (in the illustrative aspect, a drag-and-drop operating using a pointing device). That is, it is possible to return to original setting by performing the operation of changing the setting of the single-side printing to the setting of the double-side printing and an inverse operation thereof.

[4. Process Executed by Control Unit]

Figure 6:
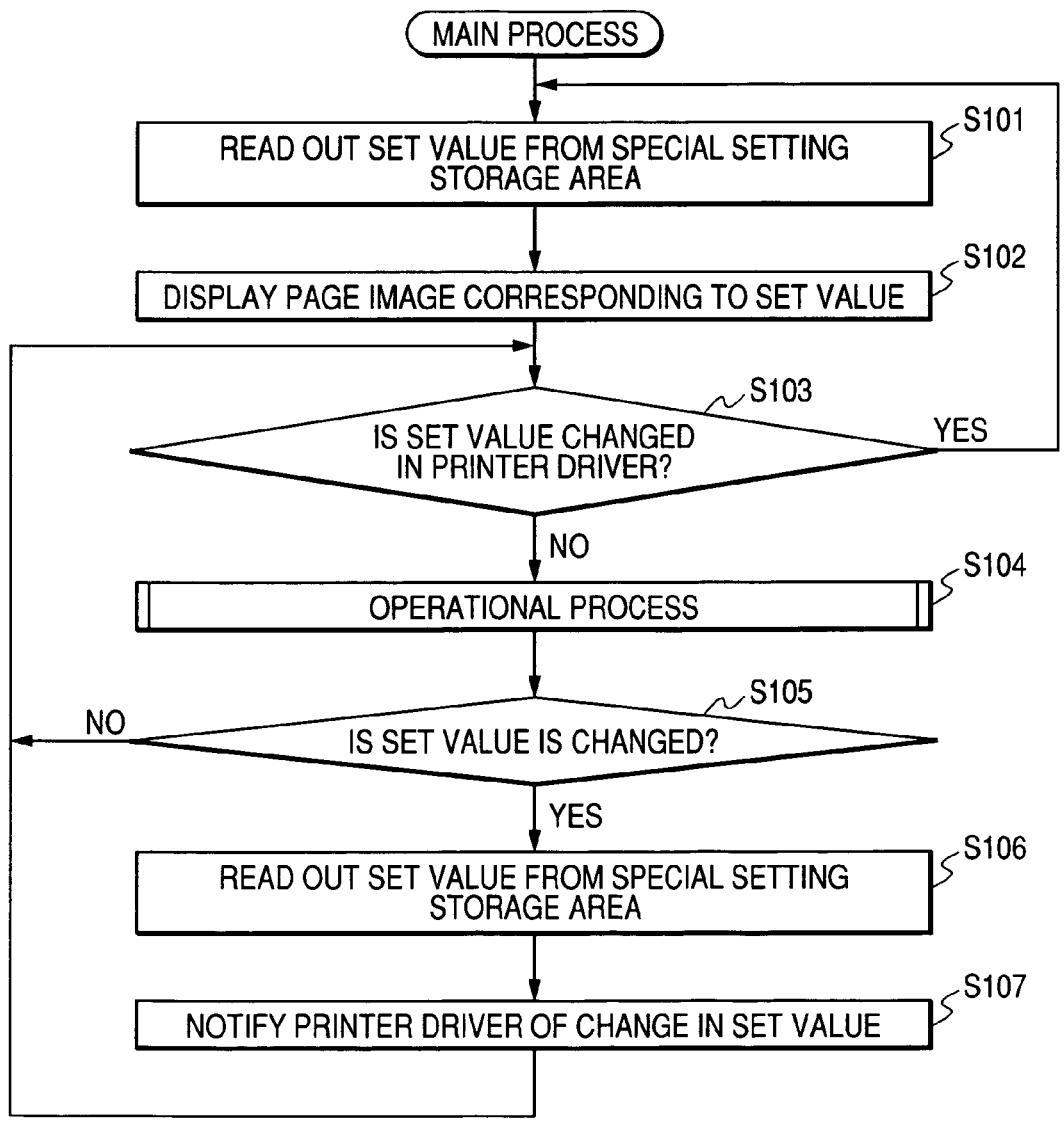
FIG. 6 is a flow chart illustrating a main process.
Figure 8:
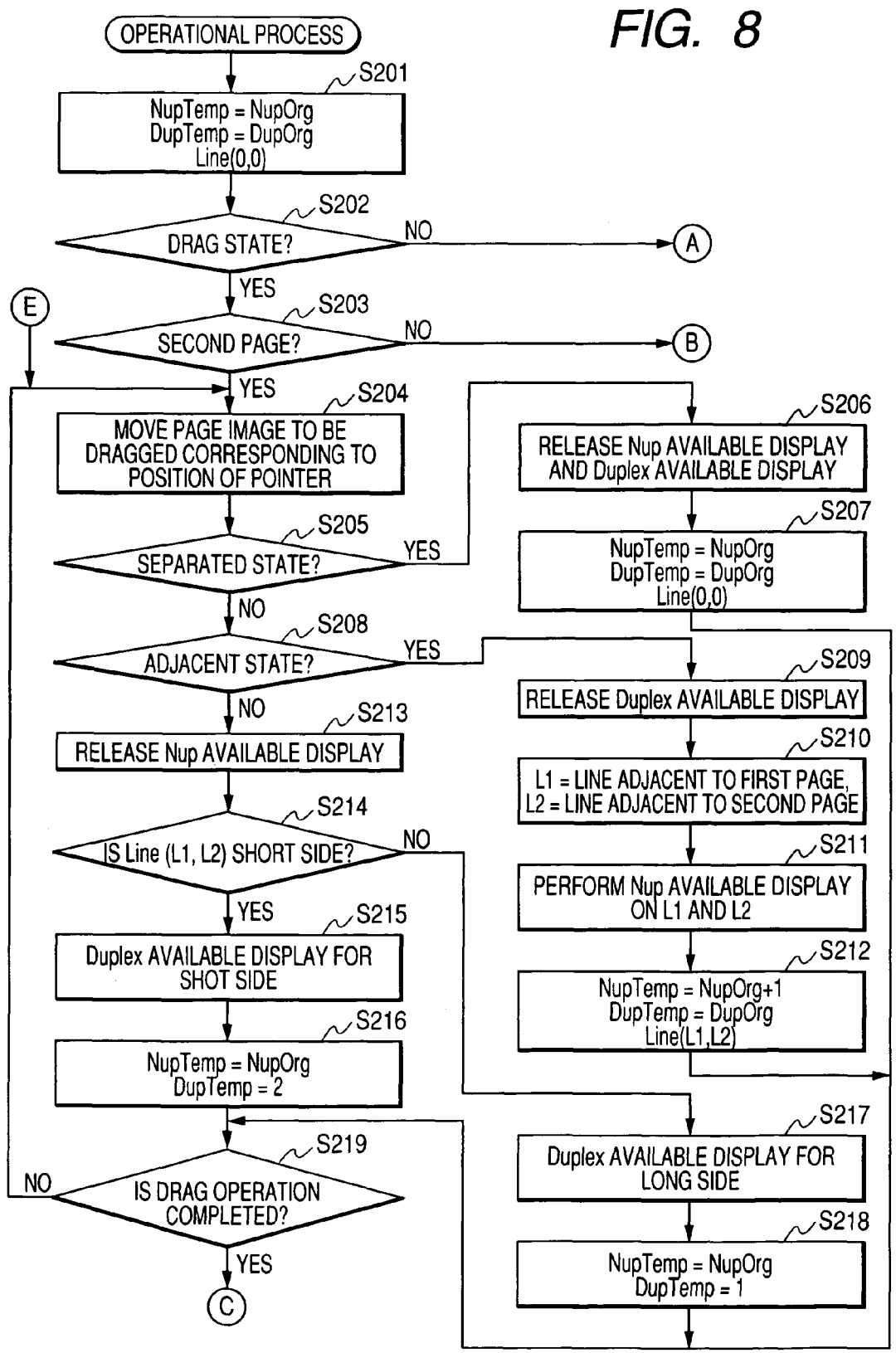
FIG. 8 is a flow chart (part 1) illustrating an operational process.
Figure 9:
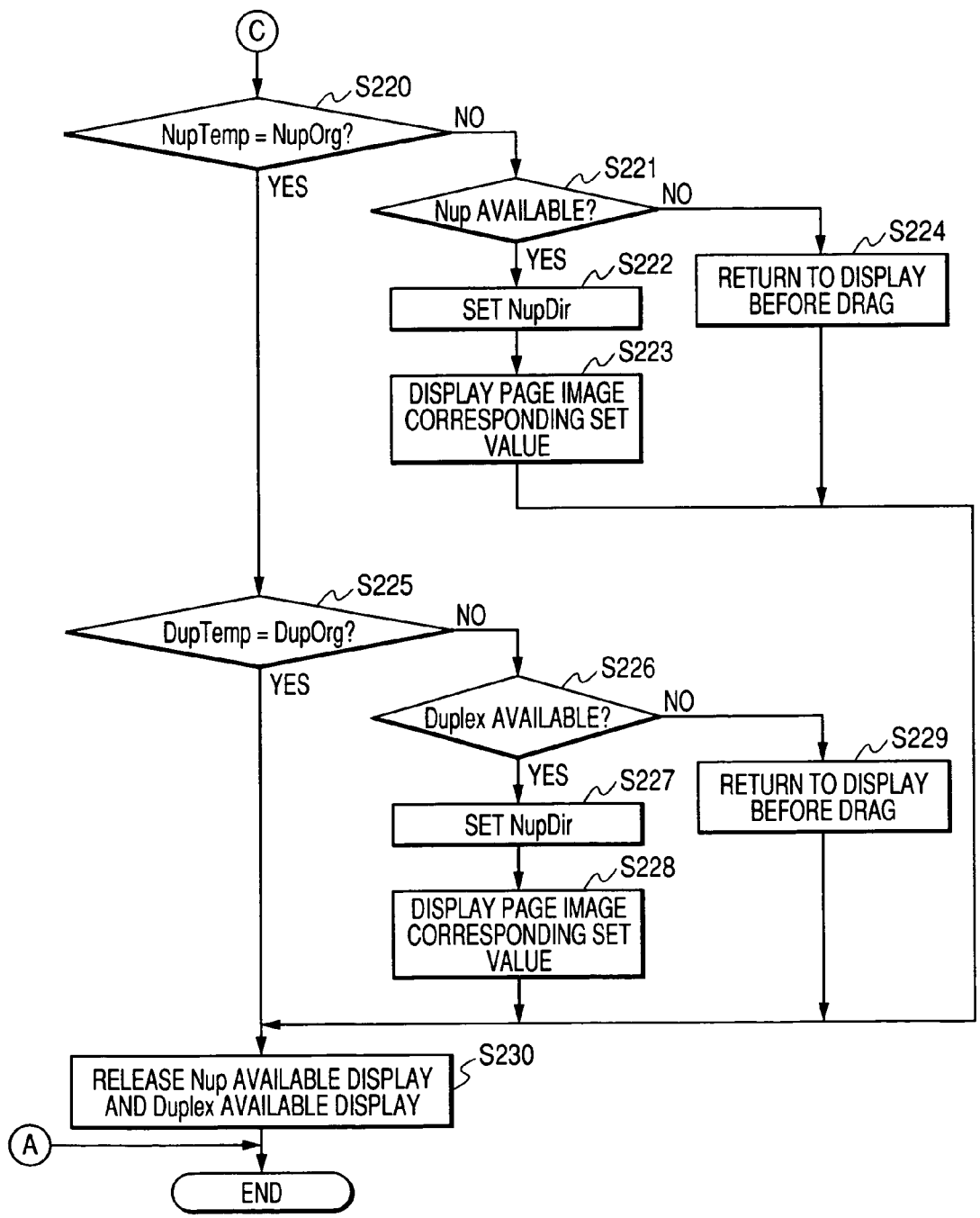
FIG. 9 is a flow chart (part 2) illustrating the operational process.
Figure 10:
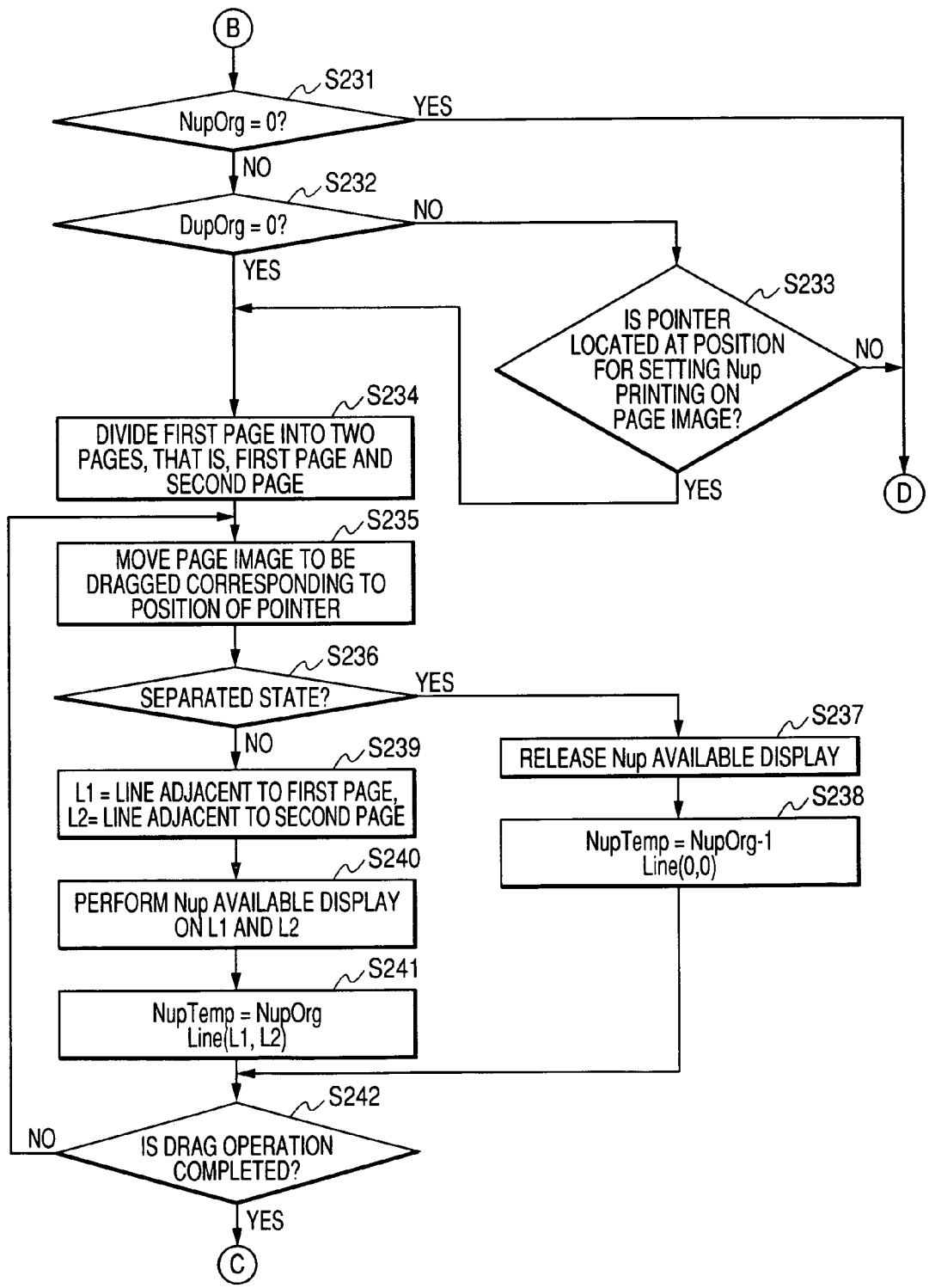
FIG. 10 is a flow chart (part 3) illustrating the operational process.
Figure 11:
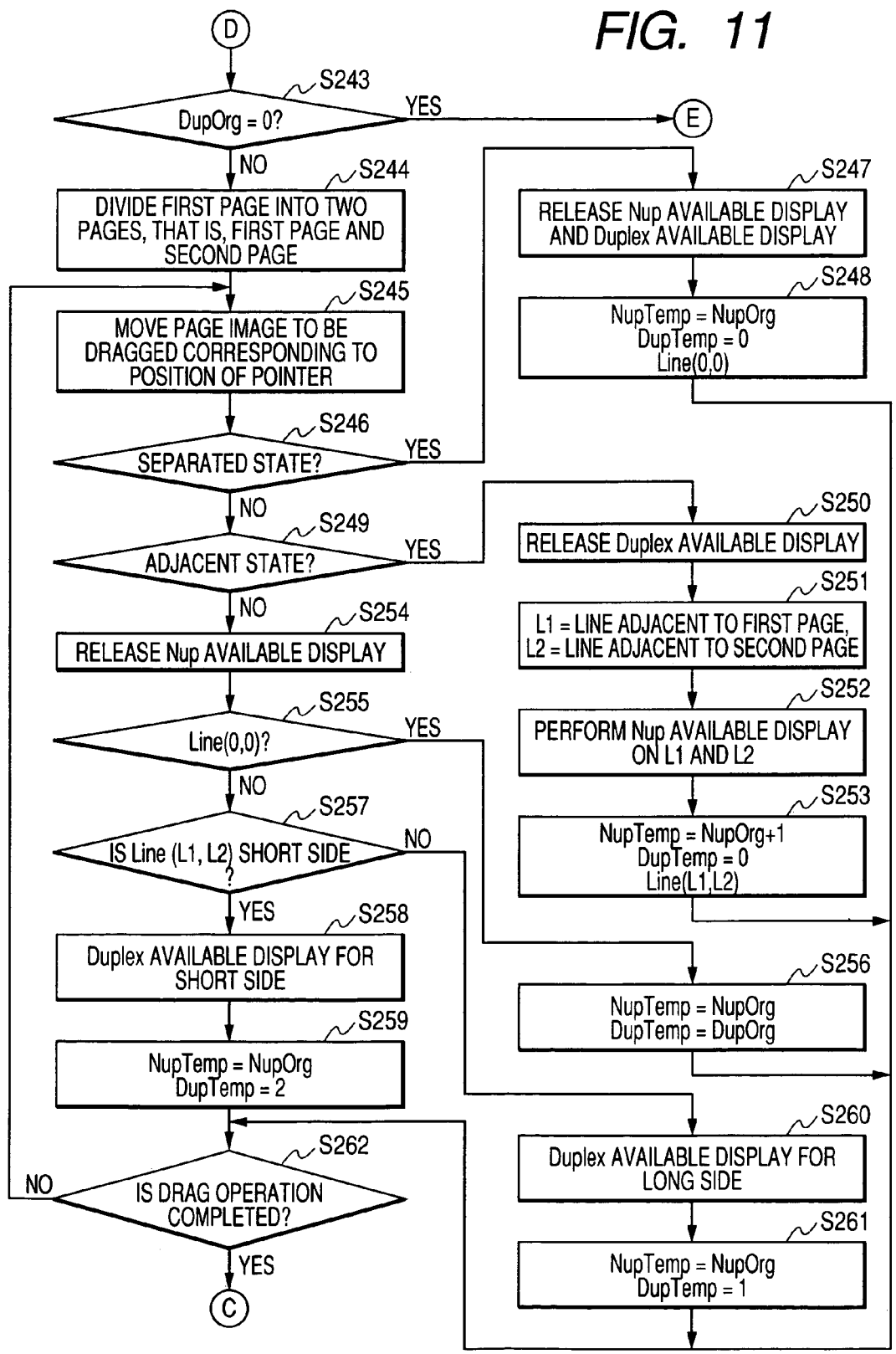
FIG. 11 is a flow chart (part 4) illustrating the operational process.

Next, a main process executed by the control unit 10 according to the print setting program 43 will be described below with reference to a flow chart shown in FIG. 6.

When the main process starts, set values of printing conditions are read from the special setting storage area 45 of the hard disk 40 in step S101. More specifically, the following values are read out: the value of NupOrg indicating the current set value related to Nup printing; the value of NupDir indicating the current set value related to the layout order of an image; and the value of DupOrg indicating the current set value related to the Duplex printing.

These values are shown in FIGS. 7A to 7C.

That is, as shown in FIG. 7A, when the value of NupOrg is zero, a normal printing mode (a 1in1 printing mode) is set. When the value of NupOrg is 1, a 2in1 printing mode (a 1in1 printing mode) is set. When the value of NupOrg is 2, a 4in1 printing mode (a 1in1 printing mode) is set. In this way, when the value of NupOrg is N, a $2^N$in1 printing mode is set.

Further, as shown in FIG. 7B, when the value of NupDir is zero, printing is set in a forward layout order. When the value of NupDir is 1, printing is set in a reverse layout order. In the illustrative aspect, the term 'forward layout order' means a general layout order. More specifically, in the Nup printing, the term 'forward layout order' means that an image is laid out from the left side to the right side (or from the upper side to the lower side). In addition, in the Duplex printing, the term 'forward layout order' means that an image is laid out the front side to the rear side. Meanwhile, in the Nup printing, the term 'reverse layout order' means that an image is laid out from the right side to the left side (or from the lower side to the upper side) In addition, in the Duplex printing, the term 'forward layout order' means that an image is laid out from the rear side to the front side.

Moreover, as shown in FIG. 7C, when the value of DupOrg is zero, a normal printing mode (single-side printing mode) is set. When the value of DupOrg is 1, printing is set to a double-side mode assuming that recording media are fastened at their long sides. When the value of DupOrg is 2, printing is set to a double-side printing mode assuming that recording media are fastened at their short sides.

When the set values of printing conditions are read out in step S101, the process proceeds to step S102, and the printing condition setting window 50 (FIG. 3) having two page images 51 corresponding to the set values thereon is displayed on the display screen of the display device 30. For example, when NupOrg=1, NupDir=0, and DupOrg=1, two page images are laid out in the forward layout order on one print page, and the page image 51 composed of two recording media overlapping each other with their rear surface being opposite to each other is displayed.

Then, in step S103, it is determined whether the set values of the printing conditions of the Nup printing or the Duplex printing are changed in the printer driver 42. That is, it is determined whether the printer driver 42, not the print setting program 43, changes the set values of the printing conditions of the Nup printing or the Duplex printing. Then, when the set values of the printing conditions of the Nup printing or the Duplex printing are changed, the printer driver 42 notifies the change to the print setting program 43. The determination in step S103 is performed on the basis of the notification.

When it is determined in step S103 that the set values of the printing conditions of the Nup printing or the Duplex printing are changed in the printer driver 42, the process returns to step S101 to read out the changed set values from the special setting storage area 45, and the page image 51 corresponding to the read set values are displayed on the display screen of the display device 30 (step S102). That is, the display of the page image 51 is updated.

On the other hand, when it is determined in step S103 that the set values of the printing conditions of the Nup printing or the Duplex printing are not changed in the printer driver 42, the process proceeds to step S104 to perform an operational process corresponding to an external operation of the input device 20. The operational process will be described later in detail (FIGS. 8 to 11).

Subsequently, in step S105, it is determined whether the set values of the printing conditions of the Nup printing or the Duplex printing are changed by the operational process performed in step S104.

When it is determined in step S105 that the set values of the printing conditions of the Nup printing or the Duplex printing are not changed, the process returns to step S103.

On the other hand, when it is determined in step S105 that the set values of the printing conditions of the Nup printing or the Duplex printing are changed, the process proceeds to step S106 to store the changed set values in the special setting storage area 45 of the hard disk 40.

Successively, in step S107, the change in the set values of the printing conditions is notified to the printer driver 42, and then the process returns to step S103.

Next, an operational process performed in step S104 of the main process (FIG. 6) will be described below with reference to flow charts shown in FIGS. 8 to 11.

When this operational process starts, first, in step S201, the values of NupOrg and DupOrg are substituted for NupTemp and DupTemp, which are temporary variables, respectively. In addition, the value of Line indicating adjacent patterns of two page images 51 is set to Line (0, 0), which is an initial value.

Then, it is determined in step S202 whether the page image 51 is in a drag state. More specifically, it is determined whether a pointer of a pointing device is arranged on the page image 51 and the page image 51 is in a selected state for dragging (a state in which a button is pushed).

Subsequently, when it is determined in step S202 that the page image is not in a drag state, the operational process is ended.

On the other hand, when it is determined in step S202 that the page image is in the drag state, the process proceeds to step S203 to determine whether the page image 51 in the drag state is a page image 51 of the second page.

Then, when it is determined in step S203 that the page image 51 in the drag state is the page image 51 of the second page, the process proceeds to step S204 to perform a display process for moving the page image 51, which is a drag target, corresponding to the position of the pointer.

Next, the positional relationship between the page image 51 of the first page and the page image 51 of the second page is determined in step S205. In this illustrative aspect, the positional relationship between two page images 51 is divided into three types of states, a separated state, a parallel state (adjacent state), and an overlapping state. More specifically, it is determined which of the adjacent state and the separated state the two page images 51 are in, according to whether one page image, which is the drag target, is entered into a predetermined region around the other page image 51 (an enlarged region of the page image 51). In addition, it is determined which of the overlapping state and the adjacent state the page images are in, according to whether the ratio of the area of the page image 51 to the area of an overlapping portion of the two page images 51 exceeds a predetermined value. In step S205, it is determined whether the positional relationship between the page image 51 of the first page and the page image 51 of the second page is the separated state.

When it is determined in step S205 that the positional relationship therebetween is the separated state, the process proceeds to step S206 to release the Nup available display and the Duplex available display. In addition, when the Nup available display or the Duplex available display is not performed, it is unnecessary to perform the process.

Then, similar to step 201, in step 207, the values of NupOrg and DupOrg are substituted for NupTemp and DupTemp, respectively, and the value of Line is set to Line (0, 0), which is an initial value. Thereafter, the process proceeds to step S219.

On the other hand, when it is determined in step S205 that the positional relationship is not in the separated state, the process proceeds to step S208 to determine whether the positional relationship between the page image 51 of the first page and the page image 51 of the second page is the adjacent state.

When it is determined in step S208 that the positional relationship therebetween is the adjacent state, the process proceeds to step S209 to release the Duplex available display.

Then, in step S210, a number indicating one of four sides of the page image 51 of the first page which is adjacent to the page image 51 of the second page is substituted for a variable L1. Similarly, a number indicating one of four sides of the page image 51 of the second page which is adjacent to the page image 51 of the first page is substituted for a variable L2. More specifically, among four sides of the page image 51, an upper side, a left side, a lower side, and a right side are represented by numbers 1, 2, 3, and 4, respectively, and the numbers are substituted for the variables L1 and L2. In addition, two opposite sides having a shortest distance therebetween (the right side of the first page and the left side of the second page, the left side of the first page and the right side of the second page, the upper side of the first page and the lower side of the second page, or the lower side of the first page and the upper side of the second page) can be determined as the adjacent sides.

Subsequently, in step S211, the Nup available display is performed on sides of the page images 51 corresponding to the variables L1 and L2.

Then, in step S212, a value obtained by adding 1 to the value of NupOrg is substituted for NupTemp, and the value of Line is set to Line (L1, L2). Thereafter, the process proceeds to step S209.

On the other hand, when it is determined in step S208 that the positional relationship is not in the adjacent state (that is, the positional relationship is in the overlapping state), the process proceeds to step S213 to release the Nup available display.

Successively, in step S214, it is determined whether Line (L1, L2) indicates a short side. That is, it is determined whether, among short sides and long sides of the page images 51, the adjacent state where the short sides are adjacent to each other turns to the overlapping state, or whether the adjacent state where the long sides are adjacent to each other turns to the overlapping stage. In other words, it is determined whether the page images 51 overlap each other in the direction of the short side, or in the direction of the long side.

When it is determined in step S214 that Line (L1, L2) indicates the short side, the process proceeds to step S215 to perform Duplex available display for a short side. Here, the term 'Duplex available display for a short side' means Duplex available display indicating that printing can be set to a double-side printing mode assuming that recording media are fastened at their short sides. More specifically, an icon (whose spreading direction is different from that of the icon 55 shown in FIG. 5B by 90°) indicating the state in which two recording media are fastened at their short sides is displayed, and the page image 51 and the print page number 53 are reversely displayed in the longitudinal direction (vertical direction).

Then, in step S216, the value of NupOrg is substituted for NupTemp, and the value of DupTemp is set to 2. Thereafter, the process proceeds to step S219.

On the other hand, when it is determined in step S214 that Line (L1, L2) does not indicate the short side, the process proceeds to step S217 to perform Duplex available display for a long side. Here, the term 'Duplex available display for a long side' means Duplex available display indicating that printing can be set to a double-side printing mode assuming that recording media are fastened at their long sides. More specifically, the icon 55 indicating the state in which two recording media are fastened at their long sides is displayed, and the page image 51 and the print page number 53 are reversely displayed in the lateral direction (horizontal direction) (FIG. 5B).

Subsequently, in step S218, the value of NupOrg is substituted for NupTemp, and the value of DupTemp is set to 1. Thereafter, the process proceeds to step S219.

In step S219, it is determined whether the drag operation is completed (that is, whether the drop operation is performed).

When it is determined in step S219 that the drag operation is not completed (that is, the drag state is maintained), the process proceeds to step S204.

On the other hand, when it is determined in step S219 that the drag operation is completed, the process proceeds to step S220.

In step S220, it is determined whether the value of NupTemp is equal to the value of NupOrg.

When it is determined in step S220 that the value of NupTemp is not equal to the value of NupOrg, the process proceeds to step S221 to determine whether the set values of the printing conditions of the Nup printing can be changed. Here, when the page images 51 are arranged in an unconsidered direction (for example, when an elongated page image 51 is arranged in the longitudinal direction), or when the value of N in Nin1 exceeds a set range, it may be difficult to change the set values of the printing conditions of the Nup printing.

On the other hand, when it is determined in step S221 that it is possible to change the set values of the printing conditions of the Nup printing, the process proceeds to step S222 to substitute the value of NupTemp for NupOrg. In addition, the setting of NupDir is performed. More specifically, the arrangement order of the page images 51 is determined on the basis of Line (L1, L2), and the layout order of images is set according to the arrangement order. That is, when the page image 51 of the first page and the page image 51 of the second page are arranged on the left and right sides, respectively, and when the page image 51 of the first page and the page image 51 of the second page are arranged on the right and left sides, respectively, the layout order of images is reversed. In this way, the layout order of images is set according to the arrangement order of two page images 51.

Subsequently, in step S223, the page image 51 corresponding to the set value is displayed on the display screen of the display device 30. That is, the display of the page image 51 is updated. Then, the process proceeds to step S230.

On the other hand, when it is determined in step S221 that it is impossible to change the set values of the printing conditions of the Nup printing, the process proceeds to step S224 to return the printing condition setting window 50 displayed on the display screen of the display device 30 to the state before dragging, thereby rejecting changing the set values of the printing conditions of the Nup printing. Thereafter, the process proceeds to step S230.

When it is determined in step S220 that the value of NupTemp is equal to the value of NupOrg, the process proceeds to step S225 to determine whether the value of DupTemp is equal to the value of DupOrg.

When it is determined in step S225 that the value of DupTemp is not equal to the value of DupOrg, the process proceeds to step S226 to determine whether it is possible to change the set values of the printing conditions of the Duplex printing. In this step, for example, when the double-side printing has already been set, it is determined that the set values of the printing conditions of the Duplex printing cannot be changed.

When it is determined in step S226 that it is possible to change the set values of the printing conditions of the Duplex printing, the process proceeds to step S227 to substitute the value of DupTemp for DupOrg. In addition, the setting of NupDir is performed. More specifically, the layout order of images is set such that the page image 51 to be dragged is arranged on the rear side. That is, when the page image 51 of the first page is dragged so as to overlap the page image 51 of the second page, and when the page image 51 of the second page is dragged so as to overlap the page image 51 of the first page, the layout order of images (the arrangement of the front and rear sides) is reversed. In this way, the layout order of images is set according to the overlapping order of the two page images 51.

Successively, in step S228, the page image 51 corresponding to the set values is displayed on the display screen of the display device 30. That is, the display of the page image 51 is updated. Then, the process is proceeds to step S230.

Meanwhile, when it is determined in step S226 that it is impossible to change the set values of the printing conditions of the Duplex printing, the process proceeds to step S229 to return the printing condition setting window 50 displayed on the display screen of the display device 30 to the state before dragging, thereby rejecting changing the set values of the printing conditions of the Duplex printing. Thereafter, the process proceeds to step S230.

When it is determined in step S225 that the value of DupTemp is equal to the value of DupOrg, the process proceeds to step S230.

In step S230, the Nup available display and the Duplex available display are released. Then, this operational process is ended.

Meanwhile, when it is determined in step S230 that the dragged page image 51 is not the page image 51 of the second page (that is, the dragged page image is the page image 51 of the first image), the process proceeds to step S231.

In step S231, it is determined whether the value of NupOrg is zero (that is, whether the Nup printing is set to a normal printing mode (1in1 printing mode).

When it is determined in step S231 that the value of NupOrg is not zero (the Nup printing is set to a 2Nin1 printing mode (N≧1)), the process proceeds to step S232 to determine whether the value of DupOrg is zero (that is, whether the Duplex printing is set to a normal printing mode (a single-side printing mode)).

When it is determined in step S232 that the value of DupOrg is not zero (that is, the Duplex printing is set to a 2Nin1 printing mode and a double-side printing mode), the process proceeds to step S233 to determine whether the pointer is located at a position for changing the set values of the printing conditions of the Nup printing on the page image 51. That is, it is considered that, in a state in which the Duplex printing is set to the 2Nin1 printing mode and the double-side printing mode, setting is changed from the 2Nin1 printing mode to the Nin1 printing mode and setting is changed from the double-side printing mode to the single-side printing mode. Therefore, in the illustrative aspect, it is determined which setting operation is performed, on the basis of the position of the pointer on the page image 51. For example, when the pointer is positioned at a peripheral portion of the page image 51, it is determined that an operation for changing setting from the double-side printing mode to the single-side printing mode will be performed. When the pointer is positioned at the inner side (central portion) of the page image 51 from the peripheral portion thereof, it is determined that an operation for changing setting from the 2Nin1 printing mode to the Nin1 printing mode will be performed. In addition, a mark (for example, an icon) indicating which of the peripheral portion and the central portion the pointer is positioned at may be displayed before the page image 51 is dragged, which makes it possible to improve operationality.

When it is determined in step S233 that the pointer is positioned at the position for changing the set values of the printing conditions of the Nup printing on the page image 51, the process proceeds to step S234.

Meanwhile, when it is determined in step S232 that the value of DupOrg is zero (that is, printing is set to the 2Nin1 printing mode and the single-side printing mode), the process also proceeds to step S234.

In step S234, the page image 51 of the first page is divided into two page images arranged in parallel to each other (that is, a state immediately before setting is changed from the Nin1 printing mode to the 2Nin1 printing mode (before the drop operation is performed). In this case, for the convenience of processing, one of the two page images is regarded as the first page, and the other page image is regarded as the second page, until this operational process is ended.

Then, in step S235, a display process is performed for moving the page image 51 to be dragged (the page image 51 of one of the first and second pages which is selected by the pointer), corresponding to the position of the pointer.

Subsequently, in step S236, it is determined whether the positional relationship between the page image 51 of the first page and the page image 51 of the second page is in the separated state.

When it is determined in step S236 that the positional relationship therebetween is in the separated state, the process proceeds to step S237 to release the Nup available display.

Then, in step S238, a value obtained by subtracting 1 from the value of NupOrg is substituted for NupTemp, and the value of Line is set to Line (0, 0), which is an initial value. Thereafter, the process proceeds to step S242.

Meanwhile, when it is determined in step S236 that the positional relationship is not in the separated state (that is, it is determined that the positional relationship is in the adjacent state or the overlapping state), the process proceeds to step S239. In step S239, a number indicating one of four sides of the page image 51 of the first page which is adjacent to the page image 51 of the second page is substituted for the variable L1, and similarly, a number indicating one of four sides of the page image 51 of the second page which is adjacent to the page image 51 of the first page is substituted for the variable L2.

Then, in step S240, the Nup available display is performed on sides of the page images 51 corresponding to the variables L1 and L2.

Subsequently, in step S241, the value of NupOrg is substituted for NupTemp, and the value of Line is set to Line (L1, L2). Thereafter, the process proceeds to step S242.

In step S242, it is determined whether the drag operation is completed (that is, the drop operation is performed).

When it is determined in step S242 that the drag operation is not completed (that is, the drag state is maintained), the process returns to step S235.

On the other hand, when it is determined in step S242 that the drag operation is completed, the process proceeds to step S220. Processes subsequent to step S220 are performed in the same manner as described above.

In contrast, when it is determined in step S231 that the value of NupOrg is zero (printing is set to the normal printing mode (1in1 printing mode), or when it is determined in step S233 that, in the 2Nin1 printing mode and the double-side printing mode, the pointer is not located as a position for changing the set values of the printing conditions of the Nup printing on the page image 51 (that is, a position for changing the set values of the printing conditions of the Duplex printing), the process proceeds to step S243.

In step S243, it is determined whether the value of DupOrg is zero (that is, the Duplex printing is set to a normal printing mode (a single-side printing mode).

When it is determined in step S243 that the value of DupOrg is zero (such determination is made in step S243 when printing is set to the 1in1 printing mode and the single-side printing mode, that is, when the image pages 51 cannot be separated from each other), the process proceeds to step S205. Processes subsequent to step S205 are performed in the same manner as described above.

On the other hand, when it is determined in step S243 whether the value of DupOrg is not zero (printing is set to the double-side printing mode), the process proceeds to step S244. In step S244, the page image 51 of the first page is divided into two page images 51 overlapping each other (that is, a state immediately before setting is changed from the single-side printing mode to the double-side printing mode (before the drop operation is performed). In this case, for the convenience of processing, one of the two page images is regarded as the first page, and the other page image is regarded as the second page, until this operational process is ended.

Then, in step S245, a display process is performed for moving the page image 51 to be dragged (the page image 51 of one of the first and second pages which is selected by the pointer), corresponding to the position of the pointer.

Subsequently, in step S246, it is determined whether the positional relationship between the page image 51 of the first page and the page image 51 of the second page is the separated state.

When it is determined in step S246 that the positional relationship therebetween is the separated state, the process proceeds to step S247 to release the Nup available display and the Duplex available display.

Then, in step 248, the value of NupOrg and zero are substituted for NupTemp and DupTemp, respectively. In addition, the value of Line is set to Line (0, 0), which is an initial value. Thereafter, the process proceeds to step S262.

On the other hand, when it is determined in step S246 that the positional relationship is not in the separated state, the process proceeds to step S249 to determine whether the positional relationship between the page image 51 of the first page and the page image 51 of the second page is the adjacent state.

When it is determined in step S249 that the positional relationship therebetween is the adjacent state, the process proceeds to step S250 to release the Duplex available display.

Then, in step S251, a number indicating one of four sides of the page image 51 of the first page which is adjacent to the page image 51 of the second page is substituted for the variable L1. Similarly, a number indicating one of four sides of the page image 51 of the second page which is adjacent to the page image 51 of the first page is substituted for the variable L2.

Subsequently, in step 252, the Nup available display is performed on the sides of the page images corresponding to the variables L1 and L2.

Then, in step S253, a value obtained by adding 1 to the value of NupOrg is substituted for NupTemp, and zero is substituted for DupTemp. In addition, the value of Line is set to Line (L1, L2). Thereafter, the process proceeds to step S262.

On the other hand, when it is determined in step S249 that the positional relationship is not in the adjacent state (that is, the positional relationship is in the overlapping state), the process proceeds to step S254 to release the Nup available display.

Then, in step S255, it is determined whether the value of Line is an initial value. That is, it is determined whether the positional relationship has never been changed from the overlapping state to the adjacent state since this operational process started.

When it is determined in step S255 that the value of Line is an initial value, the process proceeds to step S256 to substitute the values of NupOrg and DupOrg for NupTemp and DupTemp, respectively. Then, the process proceeds to step S262.

On the other hand, when it is determined in step S255 that the value of Line is not the initial value, the process proceeds to step S257 to determine whether Line (L1, L2) indicates a short side. That is, it is determined whether, among short sides and long sides of the page images 51, the adjacent state where the short sides are adjacent to each other turns to the overlapping state, or whether the adjacent state where the long sides are adjacent to each other turns to the overlapping stage. In other words, it is determined whether the page images 51 overlap each other in the direction of the short side, or in the direction of the long side.

When it is determined in step S257 that Line (L1, L2) indicates the short side, the process proceeds to step S258 to perform the Duplex available display for a short side.

Then, in step S259, the value of NupOrg is substituted for NupTemp, and the value of DupTemp is set to 2. Thereafter, the process proceeds to step S262.

On the other hand, when it is determined in step S257 that Line (L1, L2) does not indicate the short side (that is, Line (L1, L2) indicates a long side), the process proceeds to step S260 to perform the Duplex available display for a long side.

Subsequently, in step S261, the value of NupOrg is substituted for NupTemp, and the value of DupTemp is set to 1. Thereafter, the process proceeds to step S262.

In step S262, it is determined whether the drag operation is completed (that is, whether the drop operation is performed).

When it is determined in step S262 that the drag operation is not completed (that is, the drag state is maintained), the process returns to step S245.

On the other hand, when it is determined in step S262 that the drag operation is completed, the process proceeds to step S220. In addition, processes subsequent to step S220 are performed in the same manner as described above.

As described above, in the PC 1 according to the illustrative aspect, two page images 51 are arranged so as to be parallel to each other or so as to overlap each other by moving the page images 51 displayed on the display screen of the display device 30. In this way, setting is changed from the Nin1 printing mode to the 2Nin1 printing mode or from the single-side printing mode to the double-side printing mode. In addition, the two page images 51 are separately arranged so as to change the setting of printing from the 2Nin1 printing mode to the Nin1 printing mode or from the double-side printing mode to the single-side printing mode. In this way, the set values of printing conditions are changed by moving the page images 51 such that the set values are associated with each other, which makes it possible to perform an intuitive operation, as compared with a structure in which candidates of selectable set values are displayed in, for example, characters, figures, or icons, such that the user selects them. In addition, according to the PC 1 of the illustrative aspect, it is possible to minutely set the layout order or direction of images by changing the arrangement order, overlapping order, or overlapping direction of the page images 51. Therefore, it is not necessary to separately this setting in the dialogue box of the printer driver 42. In particular, in the PC 1 according to the illustrative aspect, page numbers 53 are displayed on the corresponding page images 51, which makes it possible to easily recognize the arrangement order, overlapping order, or overlapping direction of the page images 51.

Further, in the PC 1 according to the illustrative aspect, the Nup available display or the Duplex available display is performed on the basis of the positional relationship between two page images 51, which makes it possible to easily recognize which setting is performed by an operation of dragging the page image 51.

In the PC 1 according to the illustrative aspect, the display device 30 serves as a display unit. The input device 20 serves as an input unit. Step S102 of the main process (FIG. 6) serve as a page image display processing unit. Steps S204, S235, and S245 of the operational process (FIGS. 8 to 11) serve as a page image moving unit. Steps S205 to S218, S222, S227, S236 to S241, and S246 to S261 serve as a condition setting unit.

Although the illustrative aspect has been described above, but it goes without saying that various aspects can be made.

For example, in the PC 1 according to the above-illustrative aspect, two page images 51 are displayed. However, in the double-side printing mode, only one page image 51 may be displayed.

Further, in the PC 1 according to the illustrative aspect, the image of a recording medium having an image 52 to be actually printed thereon is used as the page image 51, and the print page number 53 is displayed in the center of the page image 51. For example, only the print page number 53 may be displayed without the image 52 to be actually printed. Alternatively, the image of a blank recording medium without both the print page number 53 and the image to be actually printed may be displayed.

Furthermore, in the PC 1 according to the illustrative aspect, it is determined which of an operation of changing the setting of printing from the 2Nin1 printing mode to the Nin1 printing mode or from the double-side printing mode to the single-side printing mode (hereinafter, referred to as a separating operation) and an operation of changing the setting of printing from Nin1 printing mode to the 2Nin1 printing mode or from the single-side printing mode to the double-side printing mode (hereinafter, referred to as a synthesizing operation) the user performs in the 2Nin1 printing mode or the double-side printing mode, on the basis of which of the page image 51 of the first page and the page image 51 of the second page is to be dragged. For example, it may be determined which of the separating operation and the synthesizing operation the user performs, on the basis of the position of the pointer on the page image 51.

Moreover, in the PC 1 according to the illustrative aspect, as a result of the drag-and-drop operation performed by the user, when it is determined that it is impossible to change the setting of printing to a desired printing mode, the display of the printing condition setting window 50 returns to the state before the drag operation. For example, the following structure may be used: an operation that the user is going to perform under the conditions that setting can be changed is estimated, and setting is changed on the basis of the estimated operation. For example, in a case in which the elongated page image 51 is arranged in the longitudinal direction, when it is estimated that the user is going to arrange the page image in the lateral direction, setting is changed such that an operation of arranging the page image in the lateral direction is performed. In this way, it is possible to prevent a change in setting due to a minor operational error.

Further, when the page image 51 is dragged to a position where setting cannot be changed, a mark indicating that setting is inexecutable (for example, an icon) may be displayed. According to this structure, it is possible to prevent a user from performing a drop operation without knowing that a pointer is positioned at a position where setting cannot be changed.

According to the above-illustrative aspect, the page image may include, for example, an image of a blank sheet, an image having a print page number displayed thereon, and an image having content to be actually printed thereon.

According to the above-illustrative aspect, a user can set printing conditions by inputting instructions to the input device and by moving the page image displayed on the display unit such that two page images are arranged in a predetermined positional relationship. Therefore, the illustrative aspect makes it possible for the user to intuitively set printing conditions, compared with a structure in which candidates of selectable set values are displayed in characters, figures, or icons, so the user can select one of them.

According to another illustrative aspect, in a first printing condition in which N page images (N is a natural number) are laid out on one print page, when it is determined that the at least two page images are moved by the page image moving unit so as to be arranged in parallel to each other, the condition setting unit changes the printing first condition to a second printing condition in which 2N page images (2N is a value that is two times larger than N) are laid out on one print page.

That is, the above-illustrative aspects set the set values with respect to so-called Nup printing (Nin1 printing), on the basis of the positional relationship between the two page images moved by the page image moving unit. More specifically, setting is changed from an Nin1 printing mode to a 2Nin1 printing mode by arranging two page images in parallel to each other. For example, in a 1in1 printing mode (in which one page image is laid out on one print page, that is, in a normal printing mode), when two page images are moved so as to be arranged in parallel to each other, the 1in1 printing mode is changed to a 2in1 printing mode. In addition, in the 2in1 printing mode, when two page images are moved so as to be arranged in parallel to each other, the 2in1 printing mode is changed to a 4in1 printing mode. The operation of arranging two page images in parallel to each other suggests an operation of arranging two print images in parallel to each other to generate one print image, which makes it possible to perform an intuitive operation.

In addition to when the two page images are arranged close to each other, when portions of the two page images overlap each other and the two page images are arranged at a predetermined gap in the allowable range, it is determined that the two pages are arranged in parallel to each other, which makes it possible to improve operationality.

According to another illustrative aspect, the condition setting unit sets a layout order of images on the print page, according to an arrangement order of the at least two page images.

According to another illustrative aspect, when it is determined that the at least two page images are moved by the page image moving unit so as to be arranged in parallel to each other, the condition setting unit causes the display unit to first display information indicating that the at least two pages are arranged in parallel to each other.

According to another illustrative aspect, in the second printing condition, the page image moving unit movably separates a portion of the at least two page images displayed on the display device by the page image display processing unit therefrom, on the basis of the instruction input to the input unit from the outside. In the second printing condition, when it is determined that the portion of the at least two page image is separated from the page image by the page image moving unit, the condition setting unit changes setting to the first printing condition.

According to the above-illustrative aspects, setting is changed from the 2Nin1 printing mode to the Nin1 printing mode by separating a portion of the page image therefrom and by moving the separated portion. For example, in a 4in1 printing mode, when a portion of a page image is separated therefrom and is then moved, the 4in1 printing mode is changed to the 2in1 printing mode. In addition, in the 2in1 printing mode, when a portion of a page image is separated therefrom and is then moved, the 2in1 printing mode is changed to the 1in1 printing mode. Therefore, the operation of separating a portion of a page image therefrom and moving the separated portion suggests an operation of dividing on print page into to print images, which makes it possible to perform an intuitive operation.

According to another illustrative aspect, in a third printing condition in which images are laid out on only one side of a print page, when it is determined that the at least two page images are moved by the page image moving unit so as to overlap each other, the condition setting unit changes the third printing condition to a fourth printing condition in which images are laid out on both sides of a print page.

That is, the above-illustrative aspects set the set values with respect to the set items of so-called Duplex printing (double-side printing), on the basis of the positional relationship between two page images moved by the page image moving unit. More specifically, a single-side printing mode is changed to a double-side printing mode by arranging two page images so as to overlap each other. The operation of arranging two page images so as to overlap each other suggests an operation of laying out two print images on both sides of a print page, which makes it possible to perform an intuitive operation. In particular, according to the structure capable of setting the set values with respect to the set items of Nup printing, it is possible to intuitively perform the setting of different printing conditions, such as Nup printing and double side printing, according to the arrangement of page images.

Further, in this structure, in addition to when the two page images exactly overlap each other, when portions of the two page images overlap each other in the allowable range, it is determined that the two pages overlap each other, which makes it possible to improve operationality.

According to another illustrative aspect, the condition setting unit sets a layout order of images on the print page, according to the overlapping order of the at least two page images that overlap each other.

According to another illustrative aspect, the condition setting unit sets a direction of images on the print page, according to which direction the two page images are moved in so as to overlap each other.

According to another illustrative aspect, when it is determined that the at least two page images are moved by the page image moving unit so as to overlap each other, the condition setting unit causes the display unit to second display information indicating that the at least two page images overlap each other.

Here, for example, an icon may be displayed or the color of a portion of or the entire page image may be changed in order to display that two page images are moved by the page image moving unit so as to overlap each other.

According to another illustrative aspect, in order to display the second information indicating, the condition setting unit reversely displays one of the at least two page images as an image representing a reversed state.

By thus configuration, it is possible to suggest the generation of a print page having two page images on both sides thereof. As a result, the configuration makes it possible for the user to more intuitively recognize that setting is changed from the single-side printing mode to the double-side printing mode. The image representing a reversed state include, for example, an image whose color is changed, a reverse image, a print page number displayed on a page image, a reverse image of the actual print image, an image having a pale color, and an image having a dark color.

According to another illustrative aspect, in the third printing condition, the page image moving unit movably separates a portion of the at least two page images displayed on the display device by the page image display processing unit therefrom, on the basis of the instruction input to the input unit from the outside. In the fourth printing condition, when it is determined that the portion of the at least two page images is separated from the at least two page images by the page image moving unit, the condition setting unit changes setting to the third printing condition.

In the above-illustrative aspects, the double-side printing mode is changed to the single-side printing mode by separating a portion of the page image therefrom and by moving the separated portion. The operation of separating a portion of the page image suggests an operation of dividing one print page into two print pages, which makes it possible to perform an intuitive operation.

According to another illustrative aspect, A storage medium readable by a computer, the storage medium storing a program of instructions executable by the computer to perform a function for information processing, the function, including: inputting an instruction input from an outside through an input unit; displaying at least two page images each representing a print page on a display unit; moving the page image displayed on the display unit, on the basis of the instruction input through the input unit from the outside; and setting a printing condition, on the basis of a positional relationship between the at least two page images that are moved.

In addition, the storage medium may include program stored in computer-readable recording media including semiconductor memories, magneto-optical disks, and magnetic disks such as flexible disks.

What is claimed is:

1. An information processing apparatus comprising:
   a display unit which displays images;
   a page image display processing unit which causes the display unit to display at least two page images each representing a print page;
   an input unit which inputs moving information from an input device indicating how a page image is moved;
   a page image moving unit which moves at least one of the at least two page images displayed on the display unit by the page image display processing unit, based on a change of the moving information while the moving information is input; and
   a condition setting unit which sets a printing layout of a print target comprising a plurality of page images that includes all page images to be printed, the print target also including the at least two page images in one print page, on the basis of a distance between the at least two page images that are moved by the page image moving unit, such that the set printing layout is applied to each of the plurality of pages in the print target, wherein in a fifth printing layout in which one page image is laid out only on one side of a print page, and the fifth printing layout is applied to each of the print pages:
   when it is determined that at least one of the at least two page images are moved by the page image moving unit in a first state where the at least two page images are adjacent to each other, the condition setting unit causes the display unit to display a 2in1 available display and changes the fifth printing layout to a sixth printing layout in which two page images are laid out on one side of a print page,
   when it is determined that at least one of the at least two page images are moved by the page image moving unit in a second state where the at least two page images overlap with each other, the condition setting unit causes the display unit to display a duplex available display and changes the fifth printing layout to a seventh printing layout in which two pages images are laid on both sides of one print page, and the seventh printing layout is applied to each of the print pages, and
   while the moving information is continuously input, as at least one of the at least two page images are moved in the second state from the first state, the condition setting unit causes the display unit to change the 2in1 available display to the duplex available display.

2. The information processing apparatus according to claim 1,
   wherein, in a first printing layout in which N page images (N is a natural number) are laid out on one print page, when it is determined that the at least one of the at least two page images are moved by the page image moving unit so as to be arranged in parallel to each other, the condition setting unit changes the first printing layout to a second printing layout in which 2N page images (2N is a value that is two times larger than N) are laid out on one print page.

3. The information processing apparatus according to claim 2,
   wherein the condition setting unit sets a layout order of images on the print page, according to an arrangement order of the at least two page images.

4. The information processing apparatus according to claim 2,
   wherein, when it is determined that the at least one of the at least two page images are moved by the page image moving unit so as to be arranged in parallel to each other, the condition setting unit causes the display unit to display first display information indicating that the at least two pages are arranged in parallel to each other.

5. The information processing apparatus according to claim 2, wherein, in the second printing layout, the page image moving unit movably separates a portion of the at least two page images displayed on the display unit by the page image display processing unit therefrom, on the basis of the moving information that is inputted, and wherein, in the second printing layout, when it is determined that the portion of the at least two page image is separated from the page image by the page image moving unit, the condition setting unit changes setting to the first printing layout.

6. The information processing apparatus according to claim 1, wherein, in a third printing layout in which images are laid out on only one side of a print page, when it is determined that the at least two page images are moved by the page image moving unit so as to overlap each other, the condition setting unit changes the third printing layout to a fourth printing layout in which images are laid out on both sides of a print page.

7. The information processing apparatus according to claim 6, wherein the condition setting unit sets a layout order of images on the print page, according to the overlapping order of the at least two page images that overlap each other.

8. The information processing apparatus according to claim 6, wherein the condition setting unit sets a direction of images on the print page, according to which direction the two page images are moved in so as to overlap each other.

9. The information processing apparatus according to claim 6, wherein, when it is determined that the at least one of the at least two page images are moved by the page image moving unit so as to overlap each other, the condition setting unit causes the display unit to display second display information indicating that the at least two page images overlap each other.

10. The information processing apparatus according to claim 9, wherein, in order to display the second display information, the condition setting unit reversely displays one of the at least two page images as an image representing a reversed state.

11. The information processing apparatus according to claim 6, wherein, in the fourth printing layout, the page image moving unit movably separates a portion of the at least two page images displayed on the display unit by the page image display processing unit therefrom, on the basis of the moving information that is inputted, and in the fourth printing layout, when it is determined that the portion of the at least two page images is separated from the at least two page images by the page image moving unit, the condition setting unit changes setting to the third printing layout.

12. The information processing apparatus according to claim 1, wherein in a first printing layout, in which one page image is laid out on one print page, the page image display processing unit causes the display unit to display first and second page images each representing a print image, and wherein in the first printing layout, when it is determined that the first and second page images displayed on the display unit are moved by the page image moving unit to positions that are adjacent to each other, the condition setting unit changes the first printing layout to a second printing layout in which two page images are laid out on one print page, and the page image display processing unit causes the display unit to display two page images, one of which includes the first and second page images laid out in one page, the other of which includes third and fourth page images laid out in one page.

13. The information processing apparatus according to claim 1, wherein, in a third printing layout in which an image is laid out only on one side of a print page, the page image display processing unit causes the display unit to display first and second page images each representing a print image, and wherein in the third printing layout, when it is determined that the first and second images displayed on the display unit are moved by the page image moving unit to positions which overlap each other, the condition setting unit changes the third printing layout to a fourth printing layout in which images are laid out on both sides of a print page, and the page image display processing unit causes the display unit to display two page images, one of which includes the first page image and information indicating that the fourth printing layout is set, the other of which includes a third page image and the information.

14. The information processing apparatus according to claim 1, wherein in a first printing layout, in which one page image is laid out on one print page, the page image display processing unit causes the display unit to display first and second page images each representing a print page, wherein in the first printing layout, when it is determined that the first page image displayed on the display unit is moved by the page image moving unit to be positioned adjacent to the second page image from a first direction, the condition setting unit changes the first printing layout to an eighth printing layout in which the first and second page images are laid out on one print page in the order of the first and the second page images in the first direction, and wherein in the first printing layout, when it is determined that the first page image displayed on the display unit is moved by the page image moving unit to be positioned adjacent to the second page image from a second direction opposite to the first direction, the condition setting unit changes the first printing layout to a ninth printing layout in which the first and second page images are laid out on one print page in the order of the first and the second direction in the second direction.

15. The information processing apparatus according to claim 1, wherein in a third printing layout, in which an image is laid out only on one side of a print page, the page image display processing unit causes the display unit to display first and second page images each representing a print page, wherein in the third printing layout, when it is determined that the first page image displayed on the display unit is moved by the page image moving unit to overlap to the second page image from a first direction, the condition setting unit changes the third printing layout to a tenth printing layout in which the first and second page images are laid out on both sides of a print page, respectively, and wherein in the third printing layout, when it is determined that the first page image displayed on the display unit is moved by the page image moving unit to overlap to the second page image from a second direction opposite to the first direction, the condition setting unit changes the third printing layout to an eleventh printing layout in which the first and second page images are laid out on both sides of a print page, while a direction of the second page image is reversed.

16. A non-transitory computer readable medium, the non-transitory computer readable medium storing a program of instructions executable by the computer to perform a function for information processing, the function, comprising:

inputting moving information from an input device indicating how a page image is moved;

displaying at least two page images each representing a print page on a display unit;

moving at least one of the at least two page images displayed on the display unit, based on a change of the moving information while the moving information is input; and setting a printing layout of a print target including a plurality of page images comprising all page images to be printed, the print target also including the at least two page images in one print page, on the basis of a distance between the at least two page images that are moved, and applying the set printing layout to each of the plurality of print pages in the print target, wherein in a fifth printing layout in which one page image is laid out only on one side of a print page, and the fifth printing layout is applied to each of the print pages:

when it is determined that at least one of the at least two page images are moved by the page image moving unit in a first state where the at least two page images are adjacent to each other, causing the display unit to display a 2in1 available display and changing the fifth printing layout to a sixth printing layout in which two page images are laid out on one side of a print page, when it is determined that at least one of the at least two page images are moved by the page image moving unit in a second state where the at least two page images overlap with each other, causing the display unit to display a duplex available display and changing the fifth printing layout to a seventh printing layout in which two pages images are laid on both sides of one print page, and the seventh printing layout is applied to each of the print pages, and while the moving information is continuously input, as at least one of the at least two page images are moved in the second state from the first state, causing the display unit to change the 2in1 available display to the duplex available display.

* * * * *